Figure 1:
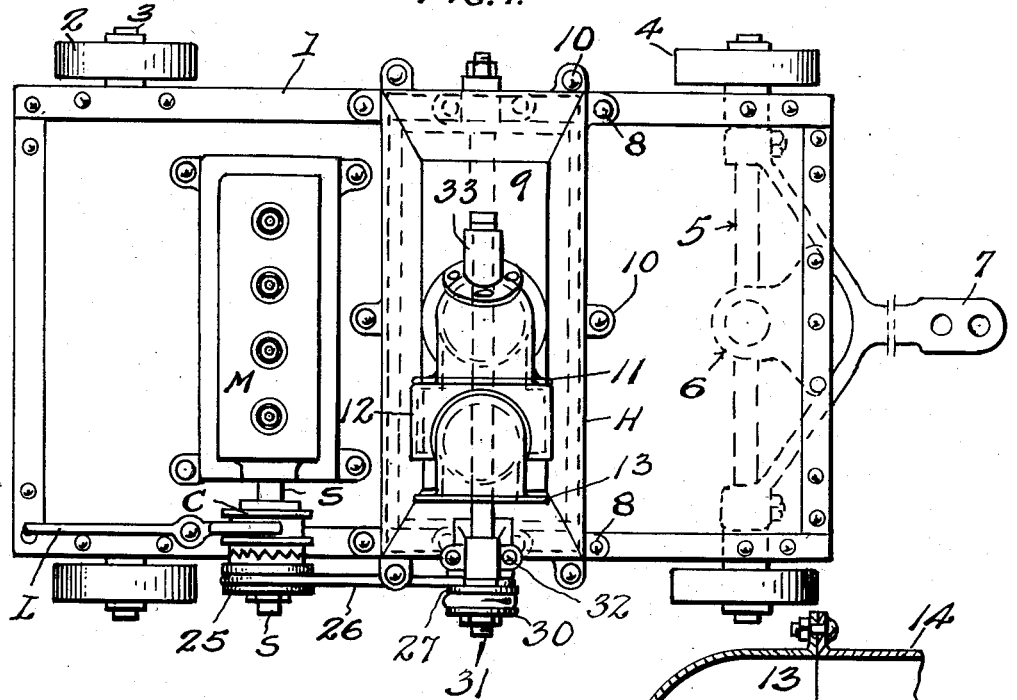

July 4, 1944.　　　　　G. E. MILLER　　　　　2,352,854
SEED HARVESTER
Filed July 7, 1943　　　　2 Sheets-Sheet 1

INVENTOR
Glen E. Miller
By Chas. K. Davies & Son
Attys.

July 4, 1944.  G. E. MILLER  2,352,854
SEED HARVESTER
Filed July 7, 1943  2 Sheets-Sheet 2
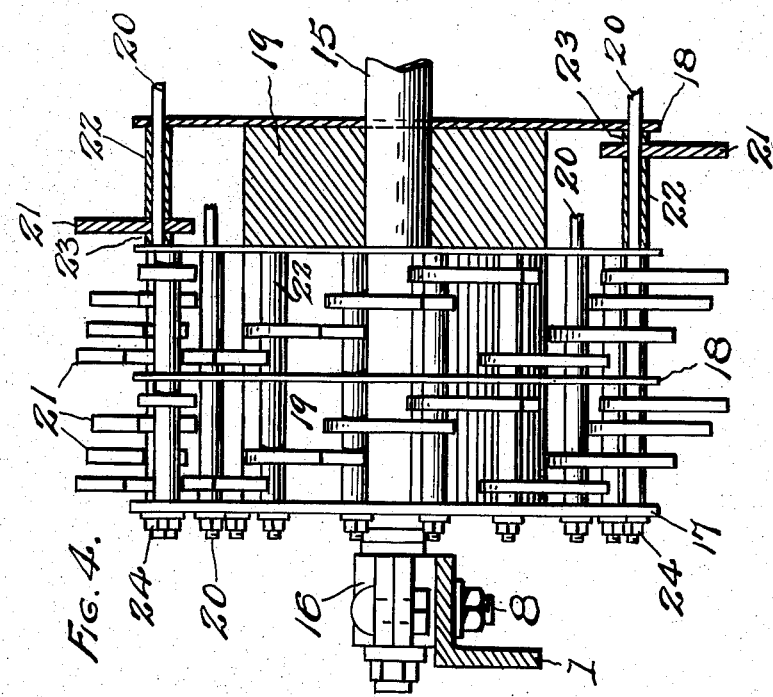
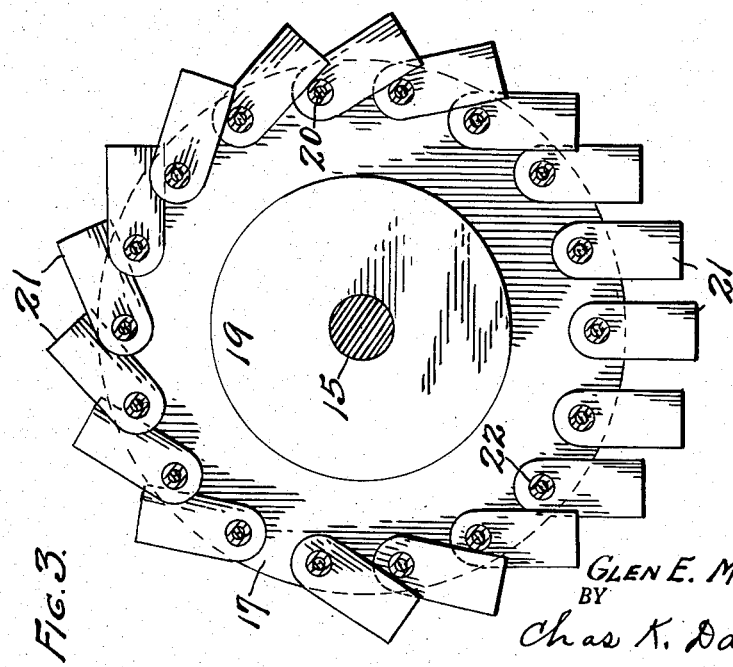
INVENTOR.
GLEN E. MILLER
BY
Chas. K. Davies & Son
Attys.

Patented July 4, 1944

2,352,854

UNITED STATES PATENT OFFICE 2,352,854

SEED HARVESTER

Glen E. Miller, Lincoln, Nebr.

Application July 7, 1943, Serial No. 493,719

7 Claims. (Cl. 56—126)

As herein disclosed my invention is embodied in a portable or wheeled implement of the suction-conveyer type employing a rotary comb or reel having pivotally mounted thereon a multiplicity of beaters revolvable therewith for extracting seed from low-growing matted or standing grass, especially, as well as from other low-growing plants or vegetation.

In many localities a very desirable low-growing, matted type of grass, known as buffalo grass, is employed by dividing the tufts and re-planting or transplanting them to grow grass lawns and other landscape work, but this method of transplanting is expensive as compared with the process of seeding the soil to grow a lawn. Because of the low-growing matted formations of buffalo grass it has heretofore been difficult and expensive to gather the small seed pods or burrs from a field of grass of this type. My improved implement is especially constructed and operated for harvesting these seeds with efficiency and facility and at low cost, in order that the more desirable method of seeding the soil may be employed in cultivating lawns.

In carrying out my invention I utilize the rotary comb with loosely pivoted beaters for removing the burrs or pods and extracting and gathering the harvest from the low-growing matted field-grass, and pneumatic means are employed for conveying the harvested material to a suitable appliance where the seeds in the burrs are later separated from foreign material and prepared for commercial use.

The invention consists in certain novel combinations and arrangements of parts as will hereinafter be more fully set forth and claimed. In the accompanying drawings I have disclosed one complete example of the physical embodiment of my invention wherein the parts are combined and arranged according to one mode I have devised for the practical application of the principles of my invention, but it will be understood that various changes and alterations may be made in the structures exemplified in the drawings, within the scope of my claims, without departing from the principles of my invention. While I have illustrated the implement as adapted to be coupled to and towed by another power propelled implement as a combine, it will be understood that the implement of my invention may be equipped with propulsion means; the construction and operation of the power-operated gearing for the rotary comb and pneumatic-conveyer unit may be altered; and various other changes may be made in the exemplifying disclosures of the drawings.

Figure 2:
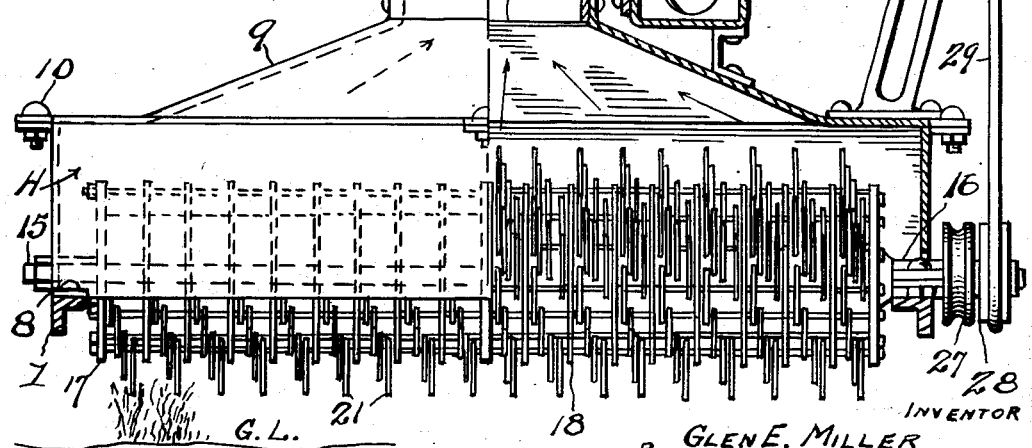

In the accompanying drawings: Figure 1 is a top plan view of the implement of my invention. Figure 2 is an enlarged view transversely of the implement showing in partial elevation and section the rotary comb and its housing, the pneumatic-conveyer unit, and one example of the operating means therefor.

Figure 3 is an enlarged detail sectional view of the rotary comb with its pivotally suspended beaters at rest; and Figure 4 is a view partly in elevation and partly in section at one end of the rotary comb.

In the general assembly view of Figure 1 a suitable motor M is mounted upon the deck of the implement, and the shaft S of the motor is provided with a conventional clutch C under control of the lever L, for transmitting power to the operating means of the rotary comb and the pneumatic or suction unit of the implement. The body of the implement includes a rectangular frame 1, with two rear wheels 2 of suitable type journaled on the rear axle 3 and two front wheels 4 journaled on the front axle 5. The front steering wheels are pivoted in suitable manner to the frame at 6, and the draw bar or tongue 7 is utilized for coupling or hitching to the propelling vehicle (not shown) in conventional manner.

An open bottom housing H extends transversely of the implement and is rigidly mounted by bolts 8 on the top of the frame 1, and the housing, as best seen in Figure 2, is fashioned with a dome shaped hood 9 bolted on top of the housing at 10. The converging walls of the hood terminate in a central hollow head 11 to the angular neck of which head a suitable fan casing 12 is attached, and the outlet elbow 13 of the casing may be utilized for conveying the harvested material to a container, or the tubular connection 14 may be connected with suitable separating means mounted on the combine previously referred to, but not shown.

By full lines and dotted lines the arrows in Figure 2 indicate the movement of air currents upwardly through the housing and the pneumatic conveyer unit, and it will be understood, of course that the joints between these enumerated parts are sealed air tight to insure an effective conveyer system for the harvested material. The lower edge of the open-bottom housing H terminates a suitable distance above the ground line G. L. in Figure 2, to insure that the harvested material may be lifted by suction through the open bottom of the housing, through annular compartments or spaces of the rotary comb and through the interior chamber of the housing, and thence passed through the conveyer unit.

The rotary reel or comb, which is partially enclosed within the housing H, is provided with a shaft 15 that is journaled in end bearings 16 mounted on the frame 1, and circular disks or end heads 17 and a similar central plate or disk are rigidly mounted on the shaft, transversely thereof, together with a series of intermediate, spaced partitions 18, to form adjoining annular compartments. These annular compartments within the interior of the housing afford a multiplicity of passages for the streams of harvested material through the interior of the housing which prevent congestion, and they guide the streams of material uniformly toward the dome shaped hood 9 through which these separated streams converge and then pass upwardly through the head 11.

The end heads, the central disk, and the partitions are spaced apart by means of hub members or spacing blocks 19 through which the shaft 15 passes, and an annular series of supporting rods 20 are passed through holes in the heads and partitions and secured at their threaded ends by nuts. The annular series of supporting rods passing through the compartments are mounted near the outer periphery of the rotary comb, and in each compartment are mounted a multiplicity of beaters 21, preferably arranged in staggered formation, and pivotally mounted or hinged on the supporting rods. The beaters are arranged in groups of four, and the staggered formation is provided by employing a long spacing tube or pipe 22 and a shorter spacing pipe 23 for each beater between adjoining partitions and the heads and adjoining partitions. The rods 20, in addition to supporting the beaters and their spacing pipes or tubes, also perform the functions of tie rods with nuts 24 threaded on their outer ends against the outer faces of the end heads, and by tightening the nuts against the heads the various parts of the comb are held in proper position. While at rest, as in Figure 3, the beaters are suspended with their outer free ends projecting beyond the outer peripheries of the heads and partitions, the majority of the beaters dangling from their supporting rods, while those at upper portion of the comb fall naturally to one side or the other of their pivots and rest upon an adjoining rod. When the comb is rotating the beaters stand out, under centrifugal action, in more or less radial alinement with the center of the comb or shaft 15, and sufficient or ample pivotal movement is provided for the beaters to compensate for impact with stones or other obstructions and irregularities in the ground line G. L. The staggered arrangement of the beaters in groups of four, more or less, insure a uniform coverage of a wide swath of field grass by the comb, and this arrangement avoids interference between adjoining groups of beaters.

Suitable driving means or power transmitting gearing may be employed between the motor shaft S and the rotary comb-shaft 15, as for instance a drive wheel or pulley 25 on the shaft and a belt 26 passing around the driven pulley 27 on the shaft 15 are illustrated for this purpose. The pneumatic-conveyer unit may also be driven from the shaft 15 of the comb by the use of a pulley 28 on the shaft and a belt 29 to a driven pulley 30 on the impeller shaft 31. The impeller shaft 31 is located above the dome-shaped hood of the housing, co-planar with the comb shaft, and journaled in suitable bearings 32, 33, and 34, and the fan or impeller 35 mounted on the shaft is located in the fan casing 12 to provide the suction to lift the harvested material through the housing and then convey the material to a suitable container, or separating appliance, as desired. The proper ratios are provided in the operating gearing between the shaft S and shafts 15 and 31, to insure the correct revolutions of the rotary comb and the air impeller or fan 35 for efficient operation of the appliance, and other necessary or essential features may be utilized to provide for mechanical operation of the various parts of the implement.

In operation it will be apparent that with the implement advancing and the rotary comb revolving under power transmitted from the motor, the loosely pivoted beaters revolving with the comb, swing and sweep forwardly through the field of grass striking the stems or blades of grass and thereby freeing the seeds, burrs, or pods from the stems.

Through the suction created by the pneumatic fan or impeller numerous separate streams of harvested material are thus drawn upwardly through the spaced compartments and the interior of the housing, and these streams converging through the hood are passed through the fan casing and thence impelled to a suitable container, or directly to a separator where foreign materials are extracted from the seeds. In this manner the staggered beaters comb a swath the width of which is determined by the length of the rotary comb, and an ample harvest of seed is effected with facility.

Having thus fully described my invention, what I claim as new and desire to secure by Letters Patent is:

1. The combination in a portable suction-operated seed-harvester having a main frame, an open-bottom housing mounted on the frame and means for creating suction through said housing, of a rotary comb mounted on the frame and partially enclosed within the housing, said comb having longitudinally spaced transversely disposed partitions forming adjoining compartments, said comb including a multiplicity of beaters pivotally mounted within each compartment, and means for rotating the comb.

2. The combination in a portable suction-operated seed-harvester having a main frame, an open-bottom housing mounted on the frame, and means for creating suction upwardly through the housing, of a rotary comb having a central shaft journaled on the frame, end-heads and intermediate partitions mounted on the shaft, spacing blocks interposed between adjoining partitions, an annular series of longitudinally extending supporting rods mounted in said heads and passing through said partitions, a multiplicity of beaters pivotally supported on said rods, and means for rotating the comb.

3. The combination in a portable seed harvester having a main frame, an open-bottom housing mounted on the frame, and means for creating an upward suction through the housing, of a rotary comb having a central shaft journaled on the frame and means for rotating the shaft, end-heads and intermediate partitions mounted on the shaft to form adjoining compartments within the housing, and a multiplicity of staggered beaters pivotally supported in each of said compartments.

4. The combination in a portable seed harvester having a main frame, an open bottom housing mounted on the frame, and means for creating suction through said housing, of a rotary comb having a central shaft journaled on the frame and means for rotating the shaft, end heads and intermediate partitions mounted on the shaft to form compartments within the housing, spaced hub members separating the heads and partitions, an annular series of supporting rods connecting said heads and passing through said partitions a multiplicity of staggered beaters pivotally supported on said rods in each compartment, and tubular spacing sleeves for said beaters mounted on the rods between adjoining partitions and heads.

5. In a wheeled seed-harvester of the suction conveyer type the combination with an open bottom housing and means for creating suction upwardly therethrough, of a rotary comb partially enclosed within the housing and operating means therefor, said comb including spaced compartments, and a multiplicity of pivotal beaters mounted on the rotary comb within each compartment.

6. In a portable seed-harvester of the suction-conveyer type, the combination with an open-bottom housing and means for creating suction upwardly therethrough, of a rotary comb partially enclosed by the housing and operating means for the comb, said comb including end-heads and intermediate partitions forming a longitudinal group of annular compartments, and an annular series of staggered beaters pivotally mounted in each compartment.

7. In a portable seed-harvester, the combination with an open-bottom housing having a dome-shaped hood, an impeller casing rigid with the hood, a rotary impeller mounted in the casing adapted to create suction upwardly through the hood and conveyer air-currents through the casing to an outlet thereof, and means for operating the impeller, of a rotary comb partially enclosed within the housing and having annular compartments open to the interior of the housing, a multiplicity of beaters pivotally mounted on the comb and located in each compartment, and means for rotating the comb.

GLEN E. MILLER.